United States Patent
Tai et al.

(10) Patent No.: US 8,076,918 B2
(45) Date of Patent: Dec. 13, 2011

(54) MULTI-PHASE DRIVING CIRCUIT WITH PHASE ADJUSTING FUNCTION

(75) Inventors: Fang-Ta Tai, Taipei Hsien (TW); Chen-Hsiang Lin, Taipei Hsien (TW); Teng-Feng Zou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 373 days.

(21) Appl. No.: 12/417,622

(22) Filed: Apr. 2, 2009

(65) Prior Publication Data
US 2010/0181976 A1 Jul. 22, 2010

(30) Foreign Application Priority Data
Jan. 16, 2009 (CN) .......................... 2009 1 0300241

(51) Int. Cl.
*G05F 1/40* (2006.01)
*G05F 1/44* (2006.01)
(52) U.S. Cl. ......... 323/282; 323/284; 323/285; 323/286
(58) Field of Classification Search .................. 323/282, 323/284, 285, 286
See application file for complete search history.

(56) References Cited

U.S. PATENT DOCUMENTS

| | | | |
|---|---|---|---|
| 7,215,102 B2 * | 5/2007 | Harris et al. ................... | 323/268 |
| 2005/0073288 A1 * | 4/2005 | Harris ............................ | 323/282 |
| 2006/0122953 A1 * | 6/2006 | Huang et al. .................... | 706/35 |
| 2009/0015305 A1 * | 1/2009 | Hwang et al. .................. | 327/175 |
| 2009/0153114 A1 * | 6/2009 | Huang ............................ | 323/282 |

* cited by examiner

*Primary Examiner* — Bao Q Vu
(74) *Attorney, Agent, or Firm* — Altis Law Group, Inc.

(57) ABSTRACT

A multi-phase driving circuit includes a single-phase pulse-width modulation (PWM) controller, a number of drivers, and a number of switch circuits connected to the number of drivers correspondingly. The single-phase PWM controller is configured for providing a single-phase PWM signal. Each of the number of drivers receives the single-phase PWM signal and adjusts a phase of the single-phase PWM signal to output an adjusted PWM signal. Each of the number of drivers also outputs a driving signal. Each of the number of switch circuits receives the adjusted PWM signal and the driving signal from a driver. Each of the number of switch circuits generates a driving voltage controlled by the driving signal and adjusts a phase of the driving voltage controlled by the adjusted PWM signal and then outputs the adjusted driving voltage, so as to make the number of switch circuits output a multi-phase driving voltage to a load.

7 Claims, 1 Drawing Sheet

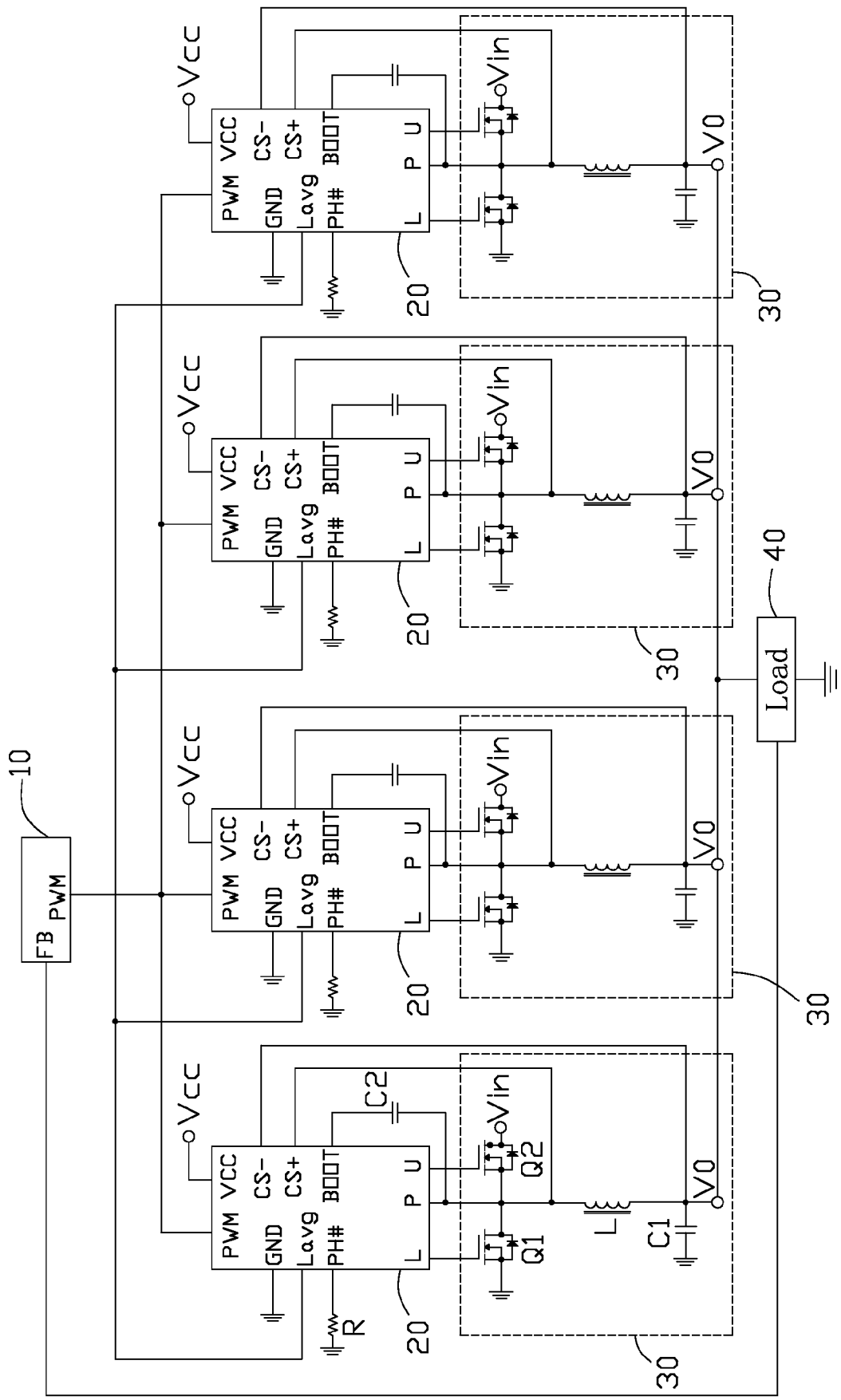

MULTI-PHASE DRIVING CIRCUIT WITH PHASE ADJUSTING FUNCTION

BACKGROUND

1. Technical Field

The present disclosure relates to driving circuits, and particularly, to a multi-phase driving circuit.

2. Description of Related Art

In general, a direct current to direct current (DC-DC) regulator system or an alternating current to direct current (AC-DC) regulator system uses a multi-phase driving circuit to drive a load. The multi-phase driving circuit ordinarily uses a multi-phase pulse-width modulation (PWM) controller to generate a plurality of PWM signals which have different phases, to provide a plurality of drivers. However, the amount of the PWM signals generated by the multi-phase PWM controller is finite, which may limit the amount of the drivers in the DC-DC or AC-DC regulator system. Furthermore, the multi-phase PWM controller is expensive.

BRIEF DESCRIPTION OF THE DRAWING

The drawing is a circuit diagram of an exemplary embodiment of a multi-phase driving circuit.

DETAILED DESCRIPTION

Referring to the drawing, an exemplary embodiment of a multi-phase driving circuit includes a single-phase pulse-width modulation (PWM) controller 10, a plurality of drivers 20 connected to the single-phase PWM controller 10, and a plurality of switch circuits 30 connected to the drivers 20 correspondingly. A feedback pin FB of the single-phase PWM controller 10 and all the switch circuits 30 are connected to a load 40. The drivers 20 can output different phase PWM signals according to requirements. In one embodiment, the number of the drivers 20 is four, while in other embodiments, the amount of the drivers 20 can be adjusted according to requirements.

A PWM signal output pin PWM of the single-phase PWM controller 10 is connected to a PWM signal input pin PWM of each driver 20, to provide a single-phase PWM signal to each driver 20.

Each driver 20 outputs a driving signal and a PWM signal to a corresponding switch circuit 30. Each switch circuit 30 generates a driving voltage controlled by the driving signal of the corresponding driver 20, and adjusts a phase of the driving voltage according to the PWM signal of the corresponding driver 20, and then outputs the adjusted driving voltage. The phases of the adjusted driving voltages of each of the switch circuits 30 are different. Thus, the plurality of adjusted driving voltages each have different phases and can drive the load 40 at the same time, namely the load 40 can work under a multi-phase driving condition.

Each switch circuit 30 includes a first metallic oxide semiconductor field effect transistor (MOSFET) Q1, a second MOSFET Q2, an inductor L, a first capacitor C1, a voltage input terminal Vin, and a voltage output terminal Vo. The voltage input terminal Vin is configured to receive an input voltage. The voltage output terminal Vo is configured to output the adjusted driving voltage to the load 40.

A power pin VCC of each driver 20 is connected to a power source Vcc. A ground pin GND of each driver 20 is grounded. Each driver 20 has a current pin Lavg. All the Lavg pins of the drivers 20 are tied together. Two detect pins CS– and CS+ of each driver 20 are respectively connected to opposite terminals of the corresponding inductor L, for detecting a current flowing through the corresponding inductor L and transmitting the current to an average current controller (not shown) in the driver 20. The average current controller of each driver 20 outputs an average current signal to the other drivers 20 via the average current pin Lavg to assure that output currents of the four switch circuits 30 are substantially equivalent.

A phase pin P of each driver 20 is connected to the voltage output terminal Vo via the inductor L of the corresponding switch circuit 30, to output the PWM signal to the corresponding switch circuit 30 to adjust the phase of the driving voltage of the corresponding switch circuit 30. A phase adjusting pin PH# of each driver 20 is grounded via a phase adjusting resistor R. Each driver 20 includes a phase controller (not shown) to adjust the phase of the single-phase PWM signal from the single-phase PWM controller 10 by adjusting a resistance of the corresponding phase adjusting resistor R. A booting pin BOOT of each driver 20 is connected to the corresponding phase pin P to pull up a voltage of the corresponding phase pin P. In one embodiment, the adjusting phase function is achieved by adjusting the resistance of the phase adjusting resistor R. In other embodiments, the phase adjusting resistor R can be changed by capacitors or inductors, therefore the adjusting phase function is achieved by adjusting the capacitance of the capacitors or the inductance of the inductors.

A low gate pin L of each driver 20 is connected to a gate of the first MOSFET Q1 of the corresponding switch circuit 30. A source of the first MOSFET Q1 is grounded. A drain of the first MOSFET Q1 is connected to the phase pin P of the corresponding driver 20 and a source of the second MOSFET Q2. A high gate pin U of each driver 20 is connected to a gate of the second MOSFET Q2 of the corresponding switch circuit 30. A drain of the second MOSFET Q2 is connected to the voltage input terminal Vin. The first capacitor C1 is connected between the voltage output terminal Vo and the ground for filtering noise.

In use, the feedback pin FB of the single-phase PWM controller 10 receives a control signal generated by the load 40, and then outputs the single-phase PWM signal to the PWM signal input pin PWM of each driver 20. Resistance of the phase adjusting resistor R is adjusted by each driver 20 to adjust the phase of the PWM signal to make the four drivers 20 output multi-phase driving signals. The low gate pin L and the high gate pin U of each driver 20 output a low gate signal (e.g., a logical zero) and a high gate signal (e.g., a logical one) to turn off the first MOSFET Q1 and turn on the second MOSFET Q2, and then the voltage output terminals Vo of the four switch circuits output a multi-phase driving voltage to the load 40.

Because the multi-phase driving circuit only uses a single-phase PWM controller 10 but does not use a multi-phase PWM controller, the number of signals that the multi-phase driving circuit can output is increased substantially. Furthermore, the adjusting phase function is achieved by adjusting the resistance of the phase adjusting resistor R, which is very simple.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A multi-phase driving circuit comprising:
   a single-phase pulse-width modulation (PWM) controller to provide a single-phase PWM signal;
   a plurality of drivers, each of the plurality of drivers connected to the single-phase PWM controller to receive the single-phase PWM signal simultaneously and adjusting a phase of the single-phase PWM signal to output an adjusted PWM signal, each of the plurality of drivers also outputting a driving signal; and
   a plurality of switch circuits connected to the plurality of drivers correspondingly, each of the plurality of switch circuits receiving the adjusted PWM signal and the driving signal from a corresponding driver, each of the plurality of switch circuits generating a driving voltage controlled by the driving signal and adjusting a phase of the driving voltage by the adjusted PWM signal, and then outputting the adjusted driving voltage to a load, so as to make the plurality of switch circuits output a multi-phase driving voltage to the load.

2. The multi-phase driving circuit of claim 1, wherein each of the plurality of drivers includes a phase adjusting pin connected to ground via a phase adjusting resistor, wherein the phase of the single-phase PWM signal is adjusted by adjusting a resistance of the phase adjusting resistor.

3. The multi-phase driving circuit of claim 2, wherein each of the plurality of switch circuits includes a first metallic oxide semiconductor field effect transistor (MOSFET) and a second MOSFET connected in series with a drain of the second MOSFET being connected to an input voltage and a source of the first MOSFET being connected to ground, wherein a low gate pin of each of the drivers is connected to a gate of the first MOSFET and a high gate pin of each of the drivers is connected to a gate of the second MOSFET, and a common node of the first and second MOSFETs is connected to an inductor positioned between a voltage output terminal and a phase pin of each of the drivers in series, and wherein the low gate pin and the high gate pin output driving signals to turn off the first MOSFET and to turn on the second MOSFET, such that the input voltage is phase adjusted by the adjusted PWM signal and provided to the load via the voltage output terminal.

4. The multi-phase driving circuit of claim 3, wherein average current pins of each of the plurality of drivers are connected together, two detect pins of each of the drivers are respectively connected to opposite terminals of the corresponding inductor to detect current flowing through the inductor and transmitting the current to the corresponding driver, each of the drivers configured to output an average current signal to the other drivers, via the average current pin, to assure that output currents of the switch circuits are substantially equivalent.

5. The multi-phase driving circuit of claim 3, wherein a node between the inductor and the voltage output terminal is grounded via a capacitor.

6. The multi-phase driving circuit of claim 3, wherein a booting pin of each of the drivers is connected to the corresponding phase pin to pull up a voltage of the phase pin.

7. The multi-phase driving circuit of claim 1, wherein a feedback pin of the single-phase PWM controller is connected to the load, to receive a control signal generated by the load and output the single-phase PWM signal to a PWM signal input pin of each driver.

* * * * *